March 13, 1956  O. P. SAWYER  2,738,243
SEALING RING
Filed Dec. 24, 1952
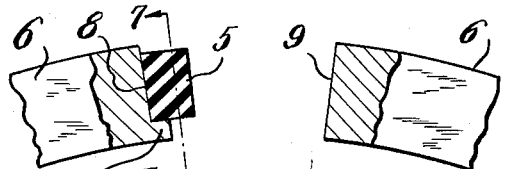
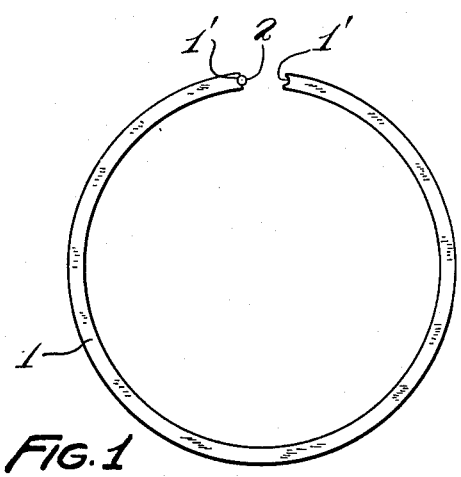
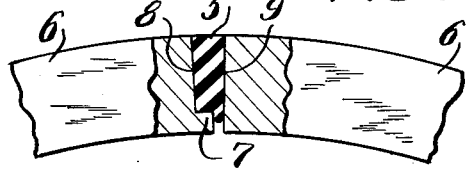
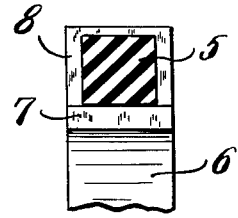
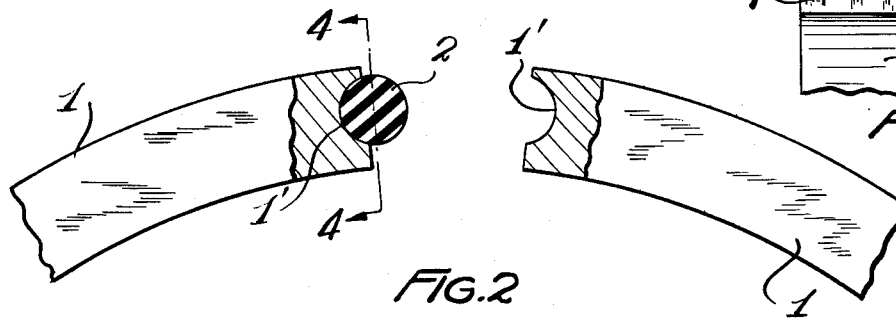
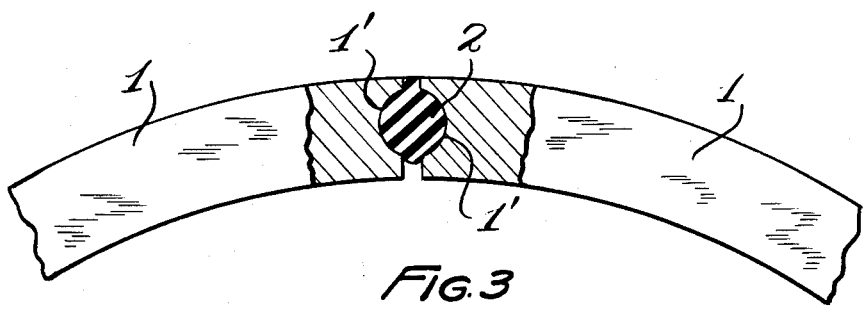
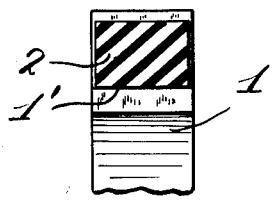
INVENTOR.
ORRIN P. SAWYER
BY
Milburn & Milburn
ATTORNEYS

United States Patent Office 2,738,243
Patented Mar. 13, 1956

2,738,243

SEALING RING

Orrin P. Sawyer, Euclid, Ohio, assignor to The Auto-Diesel Piston Ring Company, Cleveland, Ohio, a corporation of Ohio Application December 24, 1952, Serial No. 327,839

4 Claims. (Cl. 309—46)

The present invention is for an improved sealing ring, as for instance a piston ring, adapted for use in connection with air or oil, etc.

There has of course been considerable development in the art of piston rings and the like and there have been numerous attempts to prevent leakage at the joint between the two ends of the split ring. However, such attempts have been rather involved and unsuccessful, so far as I am aware, and there has not been devised a simple and inexpensive means for effectively and dependably sealing the joint of a split piston ring. This, therefore, constitutes the object of my present invention.

Other objects will appear from the following description and claims when considered together with the accompanying drawing.

Fig. 1 illustrates a piston ring with my present improvement;

Fig. 2 is an enlarged view of a part of Fig. 1 partly in section and illustrating the piston ring before being assembled in operative position;

Fig. 3 is a view, partly in elevation and partly in section, illustrating my present improved piston ring when in operative position;

Fig. 4 is a view taken on line 4—4 of Fig. 2.

Fig. 5 is a view, partly in section, illustrating another form of my invention with the ring in open condition;

Fig. 6 is a view of the same in closed condition;

Fig. 7 is a view taken on line 7—7 of Fig. 5.

Referring first to the form of device illustrated in Figs. 1 to 4 of the present drawing, the resilient split metal ring 1 has each of its ends formed with a cylindrical recess 1' that extends transversely thereof and is located near the outer or sealing surface of the ring, as indicated in the drawing. A cylindrical form of filler 2 of rubber or other suitable elastic composition for sealing is cemented within and projects circumferentially from one of said recesses 1' and is adapted to be received snugly within the recess 1' in the opposite end of the ring 1. As will be observed from the accompanying drawing, the longitudinal axes of the recesses 1' and the filler 2 are parallel with that of the ring 1. When the ring 1 is in open condition, the ends of the rubber filler 2 stop short of the corresponding surfaces of the ring 1, as indicated in Fig. 4 of the present drawing; and when in assembly, the ends of the filler 2 may become substantially flush with these surfaces due to the expansion of the rubber filler 2. The circumferential extent of the filler 2 is sufficient to be engaged under compression between the recessed ends of the ring 1 so as to completely fill the space between the outer surface portions at the two ends of the ring 1 so as to become flush with the outer surface of the ring for sealing engagement with the wall of the cylinder within which the ring is installed. In this way there will be effected a complete seal between the ends of the ring 1 and the wall of the cylinder so as to prevent any leakage of air or liquid past the same at this point.

It is to be understood that this invention may be embodied in a split resilient piston ring or the like that has its two adjacent ends of other forms than that shown in the form of device just described, and the form of the rubber filler may be varied accordingly as instanced in Figs. 5 to 7 hereof.

In the form of device illustrated in Figs. 5 to 7 of the accompanying drawing, an elastic sealing member 5 of rubber or other suitable material of rectangular cross section is cemented to a squared end portion of the split resilient ring 6 and has bearing engagement against the shoulder 7 at the inner side of the same. The other end of the ring 6 is of plain form throughout, as indicated by reference numeral 9 while the squared end portion adjoining the shoulder 7 is indicated by reference numeral 8. When in distended position, as illustrated in Fig. 5 hereof, the rubber filler 5 is spaced slightly from the outer surface of the ring 1; but, when in closed or operative condition within the cylinder, the rubber filler 5 will be compressed and expanded so as to become flush with the outer sealing surface of the ring 6 and to provide sealing engagement with the cylinder wall. When the ring is in open condition, as in Fig. 5 hereof, the sides of the filler 5 are not quite flush with the corresponding surfaces of the ring 6, as indicated in Fig. 7 of the present drawing; but, when in assembly within the cylinder, the rubber filler 5 will be expanded so as to become substantially flush with these surfaces of the ring 6.

In each of the forms of device above described, the rubber filler may be extruded inwardly between the adjacent ends of the piston ring when placed in assembly within the cylinder, as indicated in Figs. 3 and 6 of the present drawing.

Thus I have devised a simple form of elastic sealing means for a split piston ring or the like that is effective and dependable in the performance of its intended function; and this invention involves but comparatively little cost.

It is to be understood that the present form of disclosure is merely for illustrative purposes and that there might be devised various modifications thereof without departing from the spirit of my invention as herein set forth and claimed.

What I claim is:

1. A sealing device comprising a split ring of flexible material with each of its ends provided with a recess in the middle region thereof, said recesses occupying circumferentially registering relation to each other and stopping short of the surface of said ring opposite the sealing surface thereof so as to provide an abutment, a filler of solid elastic sealing composition of uniform consistency secured within one of said recesses and protruding therefrom circumferentially, said filler being normally of sufficient circumferential extent to be compressed between the ends of said ring when in operative assembly and being adapted, when so compressed, to be expanded radially so as to completely fill and seal the gap between the ends of said ring and at the sealing surface thereof.

2. A sealing device comprising a split ring of flexible material with each of its ends provided with a recess in the middle region thereof and nearer the sealing surface of said ring than the opposite surface thereof, said recesses occupying circumferentially registering relation to each other, a filler of solid elastic rubber-like sealing composition of uniform consistency throughout secured within one of said recesses and protruding therefrom circumferentially, said filler being normally of sufficient circumferential extent to be compressed between the ends of said ring when in operative assembly and being adapted, when so compressed, to be expanded radially so as to completely fill and seal the gap between the ends of said ring and at the sealing surface thereof.

3. The same structure as recited in claim 1 hereof and in which said recesses and filler are of cylindrical form with the longitudinal axis thereof parallel to that of said ring.

4. A sealing device comprising a split ring of resilient material and a filler of solid elastic sealing composition of uniform consistency throughout affixed to one end of said ring, said filler being normally of less radial extent than said ring and located nearer the sealing surface of said ring than the opposite surface thereof and being of sufficient circumferential extent to be compressed between the ends of said ring when in operative assembly and to fill and seal the gap between the ends of said ring and at the sealing surface thereof when so compressed in operative assembly.

References Cited in the file of this patent

UNITED STATES PATENTS

| | | |
|---|---|---|
| 1,239,726 | Sauer | Sept. 11, 1917 |
| 2,134,584 | Sauzedde | Oct. 25, 1938 |
| 2,383,959 | Dick | Sept. 4, 1945 |
| 2,391,159 | Hermansen | Dec. 18, 1945 |

FOREIGN PATENTS

| | | |
|---|---|---|
| 927,620 | France | Nov. 4, 1947 |